Jan. 16, 1962   B. J. McWHORTER ET AL   3,016,591
FASTENER CLIP
Filed Sept. 2, 1959

INVENTORS
BOBBY J. McWHORTER
DEAN T. JOHNSON
BY
Walter J. Jason
ATTORNEY

United States Patent Office 3,016,591
Patented Jan. 16, 1962

3,016,591
FASTENER CLIP
Bobby J. McWhorter, Lemon Grove, and Dean T. Johnson, Vista, Calif., assignors to General Dynamics Corporation, San Diego, Calif., a corporation of Delaware
Filed Sept. 2, 1959, Ser. No. 837,711
8 Claims. (Cl. 24—81)

The present invention relates generally to clips and more particularly to an improved fastener clip adapted to be firmly engaged and locked to a structural member by its inherent configuration in order to support or secure objects thereto.

In the construction of aircraft, trains, buses, trucks, etc., the rib frames that are used to form the basic framework or skeleton of the vehicle body frequently are fabricated with members of a C or Z shaped cross-sectional configuration. In order to assure a desirable strength-to-weight ratio, these structural ribs are formed with a short lipped or flanged portion at one or both extremities thereof. In adding a lip to the C or Z shape, it is known that the gauge of the metal can be considerably reduced without sacrificing the strength characteristics thereof. Further, the gauge reduction made possible by the lipped configuration correspondingly affords a weight reduction to the member.

Attachments to the rib frames usually involve bolts or rivets which pass through holes drilled in the frames. Obviously the frame is weakened in the area surrounding the hole which necessitates the use of a doubler plate around the hole or in some cases, an increase in metal gauge of the entire frame. Where items such as soundproofing or insulation frame, harnesses, and conduits are to be secured to the frames, weight penalties incurred by doublers and gauge increases are costly and not warranted by the benefits achieved. These items require only minor support to hold them firmly in place which support may be readily achieved by the use of a simple clip. However, the clips employed for such purposes must embody sufficient holding characteristics to provide the necessary support under all conditions such as the vibration caused by the vehicle engine.

Accordingly an object of the present invention is to provide a novel fastener clip having an improved construction whereby a wide variety of material thicknesses may be securely clamped to a frame member.

Another object of this invention lies in the provision of an improved fastener clip having a configuration which permits it to be positively locked against accidental displacement from its associated frame member.

Another object of this invention lies in providing a fastener clip having a novel geometrical configuration whereby the fastener clip may be positioned on a frame member in an unstressed or relaxed condition and thereafter be securely clamped thereto under tension.

A further object of this invention is to provide a fastener clip having a novel geometrical configuration whereby tension forces acting upon the opposed end portions thereof are translated into an increase in the clamping force.

Still another object of this invention lies in providing a fastener clip which is of a simple one-piece construction that requires no holes to be bored in its associated support in order to be securely attached thereto.

A still further object of this invention is to provide a fastener clip that embodies a construction characterized by its efficiency, durability, and economy.

Other objects and features of the present invention will be readily apparent to those skilled in the art from the following specification and appended drawings wherein is illustrated a preferred form of the invention, and in which.

Figure 1:
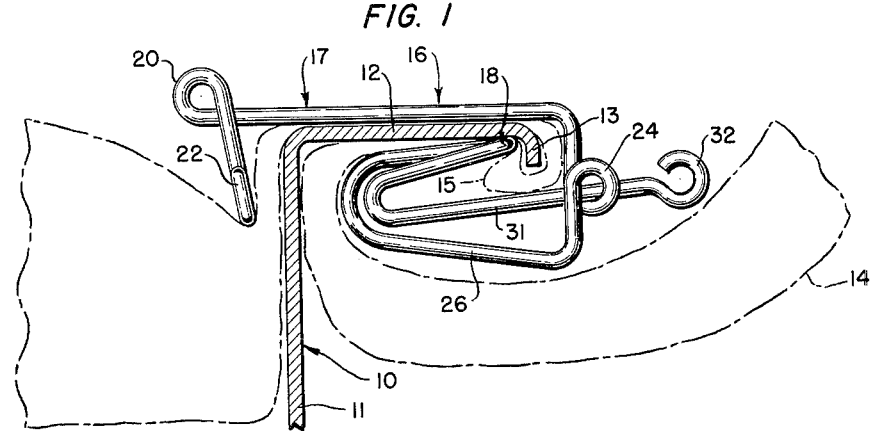
FIGURE 1 is an elevational view of the fastener clip of the present invention illustrating soundproofing material in dot and dash outline clamped to a frame member which is shown fragmentarily.

Referring now to FIGURE 1 of the drawings a frame or rib 10 illustrated fragmentarily is representative of a typical cross-sectional configuration as employed in the construction of vehicles such as aircraft, trucks, buses, trains, etc. Frame 10 is usually of a C or Z shaped configuration having a web portion 11, a flange 12, and a lip 13. Soundproofing or insulation material conventionally in the form of a blanket 14 lies adjacent the inside walls or skin (not shown) of the vehicle body bridging across a succession of individual frames 10. In order to retain blanket 14 and prevent shifting movement thereof, a loop 15 of blanket material is formed in the area of each frame 10 which material is passed over and around flange 12 of frame 10. Loop 15 of bracket 14 is clamped to frame 10 by a fastener clip in accordance with the present invention generally designated by the numeral 16.

Figure 2:
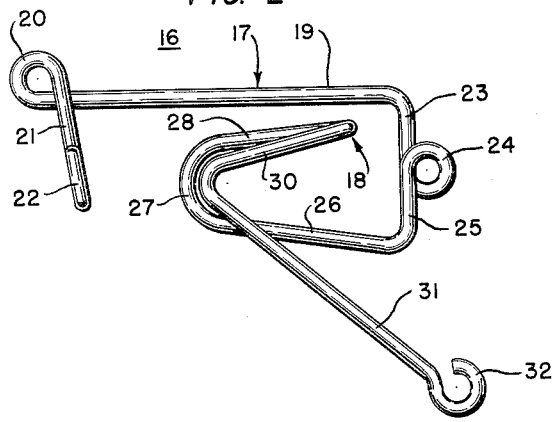
FIGURE 2 is an elevational view showing the fastener clip in a relaxed or unstressed condition.
Figure 4:
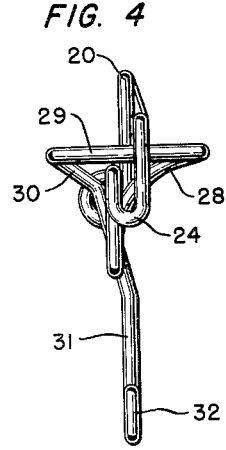
FIGURE 4 is an end elevational view of the clip of FIGURE 2.

Fastener clip 16 is preferably fabricated from flexible spring wire of suitable length but may be fabricated from suitable flat strip spring steel if so desired. Fastener clip 16 comprises a pair of spaced clamping jaw members 17 and 18 adapted to be placed on opposite sides of flange 12 of frame 10 to clamp blanket 14 against the inner and outer faces of flange 12. Outer jaw 17, as shown in FIGURE 2, is defined by a substantially horizontal run 19 having a tie loop 20 formed at one end thereof. Loop 20 rises vertically above run 19 and merges into a straight downwardly extending portion 21 which terminates in a return-bent ring-like portion 22, the center of which lies on an axis which is substantially parallel with horizontal member 19. Ring-like portion 22 serves as a hold-down means for blanket 14 as will be hereinafter described.

Figure 3:
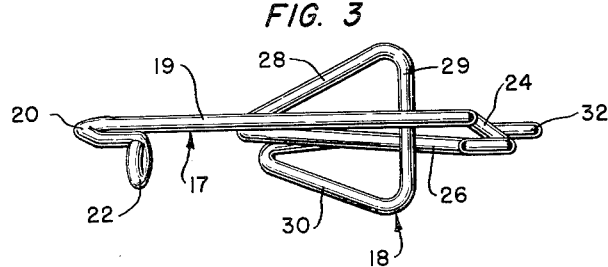
FIGURE 3 is a top or plan view of the clip of FIGURE 2.

The opposite end of horizontal member 19 merges with a right-angle, downwardly extending, leg 23 which in turn merges with a loop portion 24. The convolution of loop portion 24 is spread slightly in order to laterally space leg 23 with respect to a leg 25 which is substantially the same length as leg 23 and which extends from and below loop portion 24. Spread-apart loop portion 24 forms a catch or cradle as will be later discussed. Leg 25 merges into a slightly inclined arm 26 to complete the linking together of jaws 17 and 18. Arm 26 inclines slightly to leg 25 in the direction of run 19 and ring portion 22 and is curved as at 27 and bent backwards to form the extension 28. Lower jaw 18 is substantially triangular in plan, as shown in FIGURE 3, with extension 28 forming one leg of the triangle disposed at one side of run 19. In addition to leg 28, triangular jaw 18 includes a base section 29 which extends transversely across run 19 and a second leg 30, which is oppositely inclined to leg 28 and disposed on the opposite side of run 19.

Extending downwardly from the apex of the triangle and at an acute angle to leg 30 and integral therewith is an elongated locking or lever arm 31. Locking arm 31, as shown, angles downwardly and away from jaw members 17 and 18 and extends to a point below vertical leg portions 23 and 25 and terminates in a tie loop 32.

As stated hereinabove, fastener clip 16 may be employed to support or secure articles such as insulation blankets, conduits, harnesses, etc., to a frame or rib 10.

FIGURE 1 illustrates one desirable use of the present clip wherein it serves to secure the insulating blanket 14 in place. As shown in dash-dot outline, blanket 14 is positioned across flange 12 of frame 10 with sufficient slack to permit its being tucked under.

In order to install fastener clip 16 over blanket 14 and frame 10, jaw members 17 and 18 thereof are manually spread or flexed apart a sufficient amount to permit lateral installation over the lip 13 of frame 10. Spreading of jaw members 17 and 18 is permitted by loop portion 24 whereby jaws 17 and 18 may be opened or spread to hinge about loop portion 24 without creating distortion or permanent set damage to fastener clip 16. Upon installation of fastener clip 16 on frame 10, the inherent resiliency of the spring wire material thereof causes hold-down ring 22 of jaw member 17 to compress blanket 14 against web 11 of frame 10. Thereafter jaw members 17 and 18 are clamped into firm engagement with opposite faces of flange 12 by carrying lever arm 31 towards jaw member 17 and into catch loop portion 24 in order to cradle arm 31 therein between legs 23 and 25. Obviously in order to release fastener clip 16 from frame 10, the reverse procedure is followed.

Blanket 14 is usually fabricated in such widths as to span several frames 10. Fastener clips 16 secure blanket 14 to each of the individual frames 10 at various points of elevation. Between frames 10, blanket 14 tends to bulge into the interior of the vehicle. Bulging is effectively prevented by lacing from one frame to another with nylon cord. The cord (not shown) is tied or laced to a tie ring 32 of one fastener clip and through tie loop 20 of fastener clip 16 mounted on the adjacent frame 10. It will be apparent that as the cord is alternately laced and drawn taut through tie rings 32 and tie loops 20 of adjacent fastener clips 16, jaw members 17 and 18 thereof are further clamped into intimate engagement with opposite faces of flange 12 as a result of the eccentric loading applied to each of the fastener clips 16.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. A fastener clip formed from a single length of flexible metallic material comprising a pair of spaced apart jaw members, an integral portion connecting said jaw members, said connecting portion being substantially perpendicular to at least one of said jaw members, a catch portion formed in said connecting portion, and an elongated integral locking arm extending from one of said jaw members operable to and from engagement with said catch portion to move said one of said jaw members toward and away from the other jaw member.

2. A fastener clip formed from a single length of flexible metallic material comprising a pair of opposed clamping jaw members, one of said jaw members being formed into a reverse configuration to direct a portion of said jaw towards the other of said jaw members, a cradle portion disposed intermediate and merging with said jaw members, and an elongated locking arm depending from one of said jaw members movable into releasable engagement with said cradle portion to move and maintain said one of said jaw members into clamping relationship with the other jaw member.

3. A fastener clip formed from a single length of flexible metallic material comprising a pair of opposed clamping jaw members, a portion interconnecting said jaw members, said interconnecting portion being substantially perpendicular to at least one of said jaw members, one of said jaw members being formed into a reverse configuration to direct a portion of said jaw towards said interconnecting portion, a catch portion in the shape of a loop of material formed in said interconnecting portion, and an elongated locking arm depending from one of said jaw members movable into and out of engagement with said catch portion to move said one of said jaw members toward and away from clamping relationship with the other jaw member.

4. A fastener clip formed from a single length of flexible metallic material comprising a pair of opposed clamping jaw members, one of said jaw members embodying a single substantially straight run and the other of said jaw members embodying three portions formed to define a triangle, a portion interconnecting said jaw members, said triangular-shaped jaw member being reverse formed to direct a portion thereof towards said straight run jaw and said interconnecting portion, a cradle portion in said interconnecting portion and an elongated locking arm depending from one of said jaw members movable into and out of engagement with said cradle portion to move said one of said jaw members toward and away from clamping relationship with the other jaw member.

5. A fastener clip formed from a single length of flexible metallic material comprising a pair of opposed clamping jaw members, one of said jaw members embodying a single substantially straight run and the other of said jaw members defining a triangle embodying a pair of leg portions and a base section disposed below said straight run jaw member with said leg portions disposed at either side thereof and inclined thereto and said base section being transverse thereto, a portion interconnecting said jaw members, said interconnecting portion being substantially at right angles to at least one of said jaw members, a catch portion in the shape of a loop of material formed in said interconnecting portion, and an elongated locking arm depending from said triangular shaped jaw member movable into and out of engagement with said catch portion to move said triangular shaped jaw member toward and away from clamping relationship with the other jaw member.

6. A fastener clip formed from a single length of flexible metallic material comprising a pair of opposed clamping jaw members, one of said jaw members embodying a single substantially straight run and the other of said jaw members embodying three portions formed to define a triangle, said triangular-shaped jaw member being formed into a reverse configuration to direct a portion of said jaw towards said straight run jaw, said straight run jaw member merging into a loop of material which itself is connected to a return-bent ring-like portion, a portion interconnecting said jaw members, a cradle portion in said interconnecting portion and an elongated locking arm depending from one of said jaw members and terminating in a loop of mateerial, said locking arm being movable into and out of engagement with said cradle portion to move said one of said jaw members toward and away from clamping relationship with the other jaw member.

7. A fastener clip formed from a single length of flexible metallic material comprising a pair of opposed clamping jaw members, one of said jaw members embodying a single substantially straight run and the other of said jaw members defining a triangle embodying a pair of leg portions and a base section disposed below said straight run jaw member with said leg portions disposed at either side thereof and inclined thereto and said base section being transverse thereto, said straight run jaw member merging into a loop of material which itself is connected to a return-bent ring-like portion, a portion interconnecting said jaw members, said triangular-shaped jaw member being formed into a reverse configuration to direct said base section thereof towards said interconnecting portion, a catch portion in the shape of a loop of material formed in said interconnecting portion, and an elongated locking arm depending from said triangular shaped jaw member and terminating in a loop of material, said locking arm being movable into and out of engagement with said catch portion to move said triangular shaped jaw member toward and away from clamping relationship with the other jaw member.

8. A fastener clip formed from a single length of flexible metallic material comprising a pair of opposed clamping jaw members, one of said jaw members embodying a single substantially straight run and the other of said jaw members embodying three portions formed to define a triangle, said straight run jaw member merging into a loop of material, a portion interconnecting said jaw members, said interconnecting portion being substantially at right angles to said straight run jaw members, a catch portion in the shape of a loop of material formed in said interconnecting portion, and an elongated arm portion depending from the apex of said triangular shaped jaw member and terminating in a loop of material.

References Cited in the file of this patent

UNITED STATES PATENTS

| | | |
|---|---|---|
| 541,865 | Lundholm | July 2, 1895 |
| 700,208 | Lafo et al. | May 20, 1902 |
| 898,669 | Moore | Sept. 15, 1908 |
| 987,594 | Ostrander | Mar. 21, 1911 |

FOREIGN PATENTS

| | | |
|---|---|---|
| 15,849 | Great Britain | A.D. 1908 |